United States Patent
Uduki

(10) Patent No.: US 8,144,180 B2
(45) Date of Patent: Mar. 27, 2012

(54) OPTICAL SCANNING APPARATUS AND IMAGE FORMING APPARATUS INCLUDING THE SAME

(75) Inventor: Kazuo Uduki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/618,884

(22) Filed: Nov. 16, 2009

(65) Prior Publication Data

US 2010/0124435 A1    May 20, 2010

(30) Foreign Application Priority Data

Nov. 19, 2008  (JP) ................. 2008-295800

(51) Int. Cl.
  *B41J 15/14* (2006.01)
  *B41J 27/00* (2006.01)
(52) U.S. Cl. ........................ 347/261; 347/243
(58) Field of Classification Search .............. 347/230, 347/231, 241–244, 256–261
  See application file for complete search history.

(56) References Cited

U.S. PATENT DOCUMENTS

| | | | | |
|---|---|---|---|---|
| 6,750,997 B2 * | 6/2004 | Tamaru et al. | ............ | 359/205.1 |
| 7,319,475 B2 * | 1/2008 | Tomita et al. | ................ | 347/243 |
| 7,760,228 B2 * | 7/2010 | Mamiya | ........................ | 347/257 |
| 7,782,352 B2 * | 8/2010 | Ohsugi | ........................ | 347/242 |
| 2006/0285188 A1 | 12/2006 | Tahk | | |
| 2007/0263065 A1 | 11/2007 | Kawasaki | | |
| 2010/0091083 A1 * | 4/2010 | Itami et al. | ................... | 347/261 |

FOREIGN PATENT DOCUMENTS

| | | | |
|---|---|---|---|
| JP | 06-043379 | | 2/1994 |
| JP | 2002-072116 A | | 3/2002 |
| JP | 2005-010452 A | | 1/2005 |
| JP | 2007-079515 A | | 3/2007 |
| JP | 2007-079515A A | | 3/2007 |
| JP | 2007079515 A | * | 3/2007 |

* cited by examiner

*Primary Examiner* — Hai C Pham
(74) *Attorney, Agent, or Firm* — Canon USA Inc. IP Division

(57) ABSTRACT

An optical scanning apparatus includes a light source configured to emit a light beam, a rotational polygonal mirror configured to deflect and scan the light beam emitted from the light source, a drive unit configured to drive the rotational polygonal mirror to rotate, an optical member configured to guide the light beam with the scanning rotational polygonal mirror to a member to be scanned, a storage member configured to accommodate the rotational polygonal mirror and the optical member therewithin, and a wall configured to partition a space inside the storage member into a first space in which the rotational polygonal mirror is installed and a second space in which the optical member is installed, wherein the wall has an opening through which air can pass, and the opening is configured to pass the light beam reflected by the scanning rotational polygonal mirror, and the wall has a vent which is different from the opening and configured to send at least a part of the air that has passed through the opening, to the first space while the rotational polygonal mirror is rotating, and a width of the vent in a scanning direction of the light beam is smaller than a width of the opening.

32 Claims, 8 Drawing Sheets

OPTICAL SCANNING APPARATUS AND IMAGE FORMING APPARATUS INCLUDING THE SAME

BACKGROUND OF THE INVENTION

1. Field of the Invention

The present invention relates to an optical scanning apparatus used for an image forming apparatus such as an electrophotographic copying machine or a printer and an image forming apparatus including the same.

2. Description of the Related Art

An optical scanning apparatus included in an electrophotographic image forming apparatus includes a light source for exposing a photosensitive drum and a rotational polygonal mirror (hereinafter referred to as a polygonal mirror) for deflecting and scanning a laser beam emitted from the light source. The laser beam emitted from the light source is deflected to scan by the rotating polygonal mirror. The laser beam that has been deflected to scan by the polygonal mirror is used for scanning the photosensitive drum in a direction parallel to a rotational axis of the photosensitive drum. An electrostatic latent image is formed on the photosensitive drum charged by a charging unit with the scanning laser beam. The electrostatic latent image is developed by a toner, and a toner image on the photosensitive drum is transferred on a recording medium so that an image is formed on the recording medium.

When the polygonal mirror rotates, a steady air current is generated. There are broadly two kinds of air current. One is an air current departing from the polygonal mirror and another is an air current directed toward the polygonal mirror. Examples of the air current departing from the polygonal mirror include an air current generated by pressing air against a reflection surface of the polygonal mirror, and an air current entrained and generated around the polygonal mirror toward the polygonal mirror due to the viscosity of the air. The air currents are respectively directed in a radial direction and a tangential direction of a circumscribed circle of the polygonal mirror.

On the other hand, the air current toward the polygonal mirror flows into a space in which the air current departing from the polygonal mirror causes the air to flow out and the atmospheric pressure decreases. As described above, air in the vicinity of the polygonal mirror flows out as the air current departs from the polygonal mirror when the polygonal mirror rotates. The air current directed toward the polygonal mirror from above the polygonal mirror is generated to replenish the air that has flowed out.

When the polygonal mirror is driven to rotate, heat is generated in a motor or an integrated circuit (IC) of a driving device for rotating the polygonal mirror. The heat causes the air current departing from the polygonal mirror to heat up. The air current that has heated up applies heat to an optical member (hereinafter referred to as an optical lens) arranged in the vicinity of the polygonal mirror. Therefore, the optical lens is thermally deformed, and optical performance thereof is deteriorated.

On the other hand, Japanese Patent Application Laid-Open No. 2007-79515 discusses an optical scanning apparatus for reducing thermal expansion of an optical lens by preventing an air current departing from a polygonal mirror from striking the optical lens, as much as possible. In Japanese Patent Application Laid-Open No. 2007-79515, an air shield member which has an opening for passing a laser beam is provided between the polygonal mirror and the optical lens. This prevents an air current generated by the rotation of the polygonal mirror from striking the optical lens except in the opening, thus deformation of the lens can be reduced.

However, the optical scanning apparatus discussed in Japanese Patent Application Laid-Open No. 2007-79515 presents the following issue when miniaturized. In order to miniaturize the apparatus, distances among members installed in an optical box must be reduced. As an example, a distance between a polygonal mirror and an optical lens may be reduced. In this case, the optical lens is arranged in the vicinity of an opening for passing a laser beam. In such an apparatus, the air current can be cut off by providing a wall (an air shield member) between the polygonal mirror and the optical lens, as in Japanese Patent Application Laid-Open NO. 2007-79515. However, hot air strikes the optical lens before the temperature of the air current that has passed through the opening decreases. Therefore, the hot air that has passed through the opening deforms the optical lens.

If the distance between the polygonal mirror and the optical lens is great, the air current that has passed through the opening is cooled to some extent before striking the optical lens. Therefore, an amount of deformation of the optical lens due to the effect of the hot air is small. When the distance between the polygonal mirror and the optical lens is short, as in the above-described apparatus, however, the air current strikes the optical lens before being cooled, and the air current flowing out of the opening has difficulty passing in the vicinity of the optical lens. Therefore, the amount of thermal deformation of the optical lens increases and its effect on image quality cannot be ignored.

When the optical lens is thermally deformed, the spot diameter of a laser beam is disturbed, and an image forming position on the photosensitive drum of the laser beam is shifted, so that the image quality is deteriorated.

SUMMARY OF THE INVENTION

The present invention is directed to reducing the thermal deformation of an optical lens using an air current generated around a polygonal mirror when the polygonal mirror rotates, to reduce deterioration in image quality.

According to an aspect of the present invention, an optical scanning apparatus includes a light source configured to emit a light beam, a rotational polygonal mirror configured to deflect and scan the light beam emitted from the light source, a drive unit configured to drive the rotational polygonal mirror to rotate, an optical member configured to guide the light beam with the scanning rotational polygonal mirror to a member to be scanned, a storage member configured to accommodate the rotational polygonal mirror and the optical member therewithin, and a wall configured to partition a space inside the storage member into a first space in which the rotational polygonal mirror is installed and a second space in which the optical member is installed, wherein the wall has an opening through which air can pass, and the opening is configured to pass the light beam reflected by the scanning rotational polygonal mirror, and the wall has a vent which is different from the opening and configured to send at least a part of the air that has passed through the opening, to the first space while the rotational polygonal mirror is rotating, and a width of the vent in a scanning direction of the light beam is smaller than a width of the opening.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
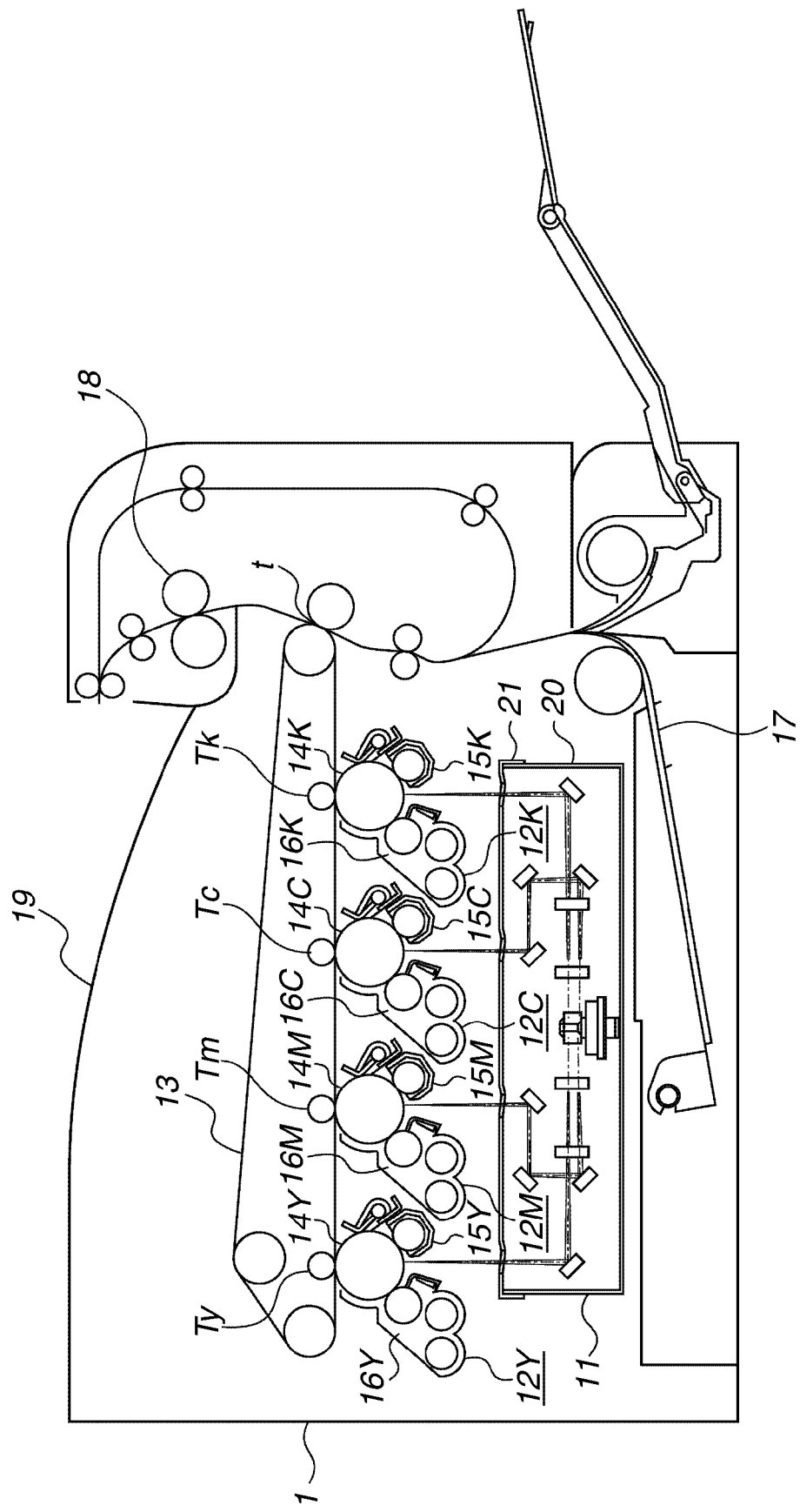
FIG. 1 is cross sectional view of an image forming apparatus in a first exemplary embodiment.

FIG. 1 illustrates an image forming apparatus 1 in a first exemplary embodiment. The image forming apparatus 1 in the present exemplary embodiment is a tandem type image forming apparatus, which includes image forming units 12 (12Y, 12M, 12C, 12K) for colors, i.e., yellow (Y), magenta (M), cyan (C), and black (K), and superimposes a toner image formed by each of the image forming units 12 on an intermediate transfer belt 13. In the description, the suffixes Y, M, C, and K following reference numerals denote yellow, magenta, cyan and black colors, respectively. The image forming apparatus 1 in the present exemplary embodiment includes an optical scanning apparatus 11 in which light sources respectively corresponding to the colors are attached to an optical box 20. A casing (an storage member) of the optical scanning apparatus 11 includes the optical box 20 and a cover member 21 for sealing the optical box 20. In the present exemplary embodiment, the optical box 20 is injection-molded from a glass reinforced resin material. The image forming units 12 corresponding to the colors respectively include photosensitive drums 14 (members to be scanned; 14Y, 14M, 14C, 14K), charging devices 15 (15Y, 15M, 15C, 15K), and developing devices 16 (16Y, 16M, 16C, 16K).

As can be seen from FIG. 1, the image forming apparatus 1 according to the present exemplary embodiment employs a system for exposing the image forming unit 12 with a beam on its lower surface by the optical scanning apparatus 11. The optical scanning apparatus 11 irradiates the beam toward the photosensitive drum 14 arranged above the optical scanning apparatus 11. However, a positional relationship between the optical scanning apparatus 11 and the image forming unit 12 is not limited to this configuration. For example, the image forming unit 12 may be arranged below the optical scanning apparatus 11.

The optical scanning apparatus 11 in the present exemplary embodiment will be described with reference to FIG. 2. The optical scanning apparatus 11 illustrated in FIG. 2 includes a plurality of light sources Ly, Lm, Lc, and Lk respectively corresponding to the colors. A laser beam is emitted according to image data from each of the light sources Ly, Lm, Lc, and Lk. The laser beam radiated from each of the light sources Ly, Lm, Lc, and Lk is used for scanning the photosensitive drum 14 in a direction parallel to the rotational axis thereof by a polygonal mirror 22 (a rotational polygonal mirror) serving as a deflector. The polygonal mirror 22 is driven to rotate by a driving device 23 including a motor. The laser beam deflected to scan by the polygonal mirror 22 is incident on optical lenses 24 (24a, 24b) and 25 (25a, 25b, 25c, 25d) serving as optical members, and is introduced onto the photosensitive drum 14. Each of the optical lenses 24 and 25 has optical characteristics for performing constant-speed scanning while focusing the laser beam on the member to be scanned.

As the optical lenses, not an optical lens which has a function of focusing light but an optical lens which has a function of diffusing light may be arranged. An optical lens which has a function based on the configuration of the image forming apparatus is installed. Although in the present exemplary embodiment, the optical lenses include a plurality of first and second optical lenses 24 and 25, a number of optical elements forming an optical system is not limited to the same.

The two first optical lenses 24a and 24b are respectively shared between beams corresponding to yellow and magenta and between beams corresponding to cyan and black, and the second optical lenses 25 are respectively arranged for the colors. Folding mirrors 26 (26a to 26h) are respectively arranged on optical paths of the beams for introducing the laser beams, which have been deflected to scan, into the respective photosensitive drums. The folding mirror 26g is arranged under the folding mirror 26b, and introduces the laser beam corresponding to magenta which has passed through the optical lens 24a into the folding mirror 26b. Similarly, the folding mirror 26h is arranged under the folding mirror 26e, and introduces the laser beam corresponding to cyan which has passed through the optical lens 24b into the folding mirror 26e. The folding mirrors 26 are respectively fixed to mounting portions of members in the optical box 20.

Figure 2:
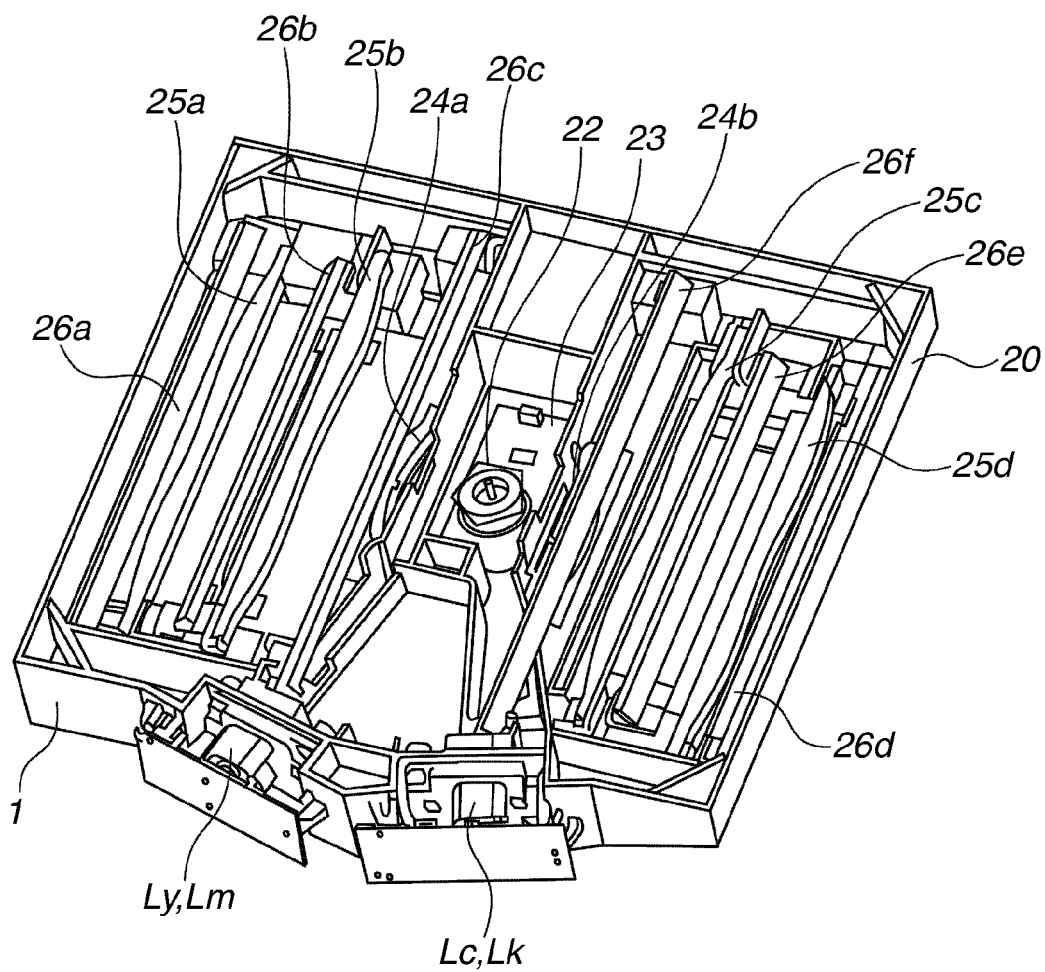
FIG. 2 is a perspective view of an optical scanning apparatus included in the image forming apparatus in the first exemplary embodiment.
Figure 3:
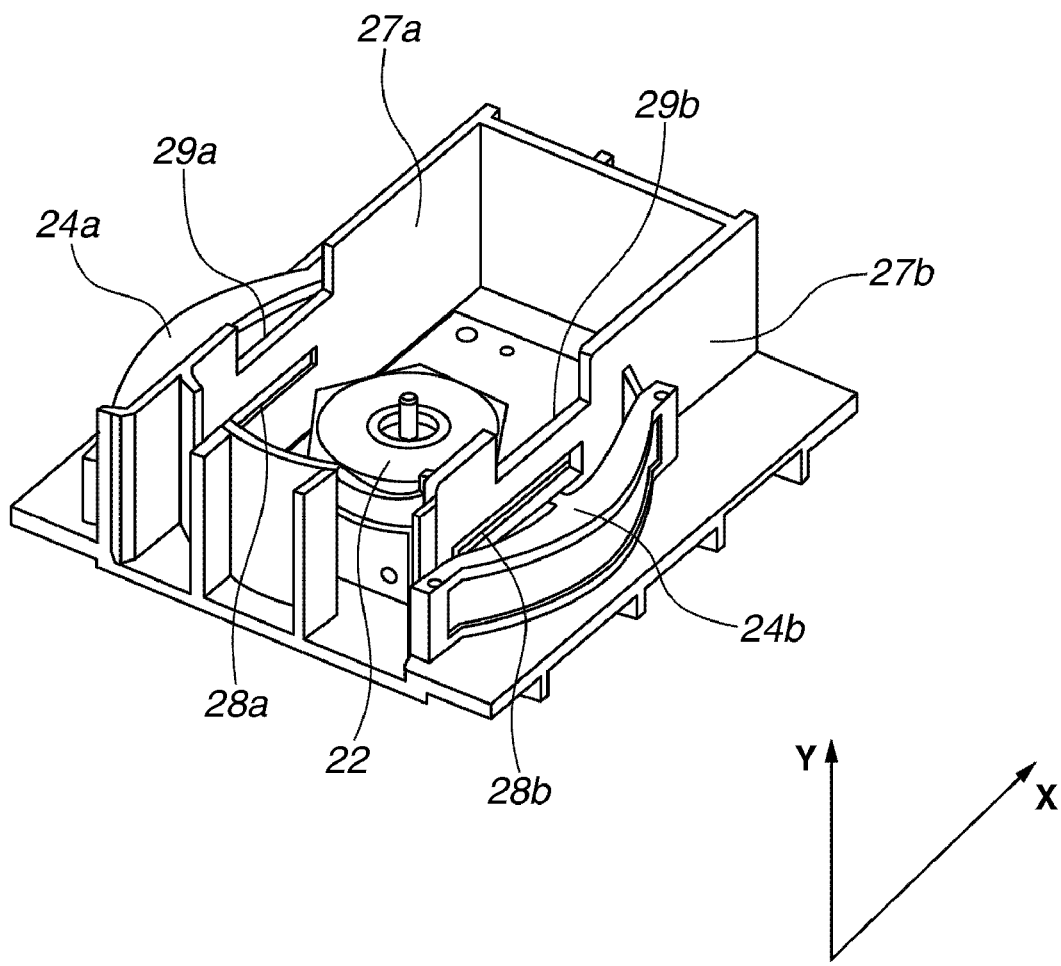
FIG. 3 is an enlarged view of a polygonal mirror and its surroundings in the optical scanning apparatus in the first exemplary embodiment.

FIG. 3 is an enlarged view of the polygonal mirror 22 and its surroundings in the optical scanning apparatus 11 illustrated in FIG. 2. As illustrated in FIG. 3, walls 27 (27a, 27b) for preventing hot air generated by the rotation of the polygonal mirror 22 from striking the first optical lenses 24 are provided around the polygonal mirror 22. The walls 27 are respectively provided to face laser incident surfaces of the first optical lenses 24. The walls 27 divide the inside of the optical box 20 into a space accommodating the polygonal mirror 22 and a space accommodating the optical lens 24. The walls 27 are respectively provided with first openings 28 (28a, 28b; hereinafter referred to as laser passing openings). A laser beam directed toward the first optical lens 24 passes through the laser passing opening 28. The laser passing opening 28 is an opening through which air is allowed to vent. A transparent member may be installed in the openings so that hot air can be prevented from striking the first optical lenses 24a and 24b. If dust adheres to the transparent member, however, the dust prevents the passage of the laser beam and deteriorates the image quality. Therefore, the laser passing openings 28 can be an opening through which air is allowed to vent.

As illustrated in FIG. 2, the optical scanning apparatus 11 according to the present exemplary embodiment deflects and scans with the laser beams emitted from the different light sources in both directions with respect to the polygonal mirror 22. Therefore, there exist a plurality of portions and members that have similar functions, for example, walls 27a and 27b and the optical lenses 24a and 24b. However, the present invention is not limited to the above-described optical scanning apparatus which includes a system for deflecting and scanning with laser beams in both directions. Therefore, the portions and the members having similar functions will be described without alphabets attached to the reference numeral (the walls 27a and 27b will be described as the walls 27, and the optical lenses 24a and 24b will be described as the optical lenses 24, for example) to simplify the description.

The wall 27 also has the function of ensuring stiffness of the optical scanning apparatus 11. In order to stably scan the laser beam on the photosensitive drums 14, the stiffness of the surroundings of the polygonal mirror 22 must be increased. Therefore, the wall 27 is provided upright from a bottom surface of the optical box 20 around the polygonal mirror 22, to increase the stiffness of the optical box 20 to inhibit the distortion of the optical box 20. The wall 27 has such a height that its upper surface comes into contact with the cover member 21. This can also inhibit the distortion of the cover member 21 due to thermal deformation.

The wall 27 has the function of preventing the laser beam, which has been deflected to scan by the polygonal mirror 22 and has been reflected on a surface of the optical lens 24, from passing through the laser passing opening 28 and returning to the polygonal mirror 22. This prevents the laser beam reflected by the optical lens 24 from being reflected by the polygonal mirror 22 again to expose the photosensitive drum 14.

Although in the present exemplary embodiment, the optical member on which the laser beam that has passed through the laser passing opening 28 is first incident is the optical lens 24, the optical member is not limited to the optical lens. For example, a reflection mirror such as a folding mirror may be arranged in the vicinity of the laser passing opening 28, and the optical member on which the laser beam that has passed through the laser passing opening 28 is first incident may be the reflection mirror.

Figure 6:
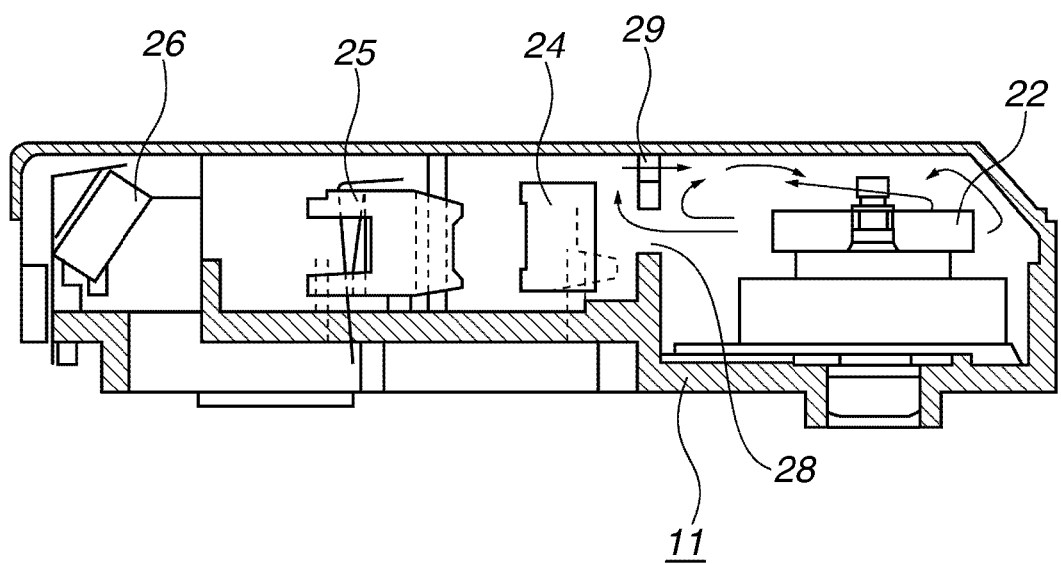
FIG. 6 illustrates another form of the optical scanning apparatus in the first exemplary embodiment.

Although the optical scanning apparatus 11 illustrated in the present exemplary embodiment has a system for scanning with a plurality of laser beams respectively corresponding to the colors which are incident on the one polygonal mirror 22 form directions facing the polygonal mirror 22. However, the system does not necessarily include one polygonal mirror for scanning. For example, the optical scanning apparatus 11 may have a system which provides the polygonal mirror 22 for the photosensitive drum 14 of each color and independently exposes the photosensitive drums 14 with the laser beam, as illustrated in FIG. 6.

An image forming process in the image forming apparatus according to the present exemplary embodiment will be described. The light source in the optical scanning apparatus 11 emits a laser beam based on input image data. The emitted laser beam is deflected to scan in a predetermined direction by the polygonal mirror 22, to form an electrostatic latent image on the photosensitive drum 14 (on a photosensitive member) uniformly charged by the charging device 15. The developing device 16 visualizes the electrostatic latent image using toner. A transfer device (not illustrated) transfers a toner image on the photosensitive drum 14 to the intermediate transfer belt 13 at primary transfer units T (Ty, Tm, Tc, Tk). The transfer device (not illustrated) transfers the toner image on the intermediate transfer belt 13 on a recording medium such as paper conveyed from a paper feeding unit 17 at a secondary transfer unit t. The toner image transferred on the recording medium is heated and fixed to the recording medium by a fixing device 18 and is discharged to a paper discharge unit 19.

An air current generated within the optical box 20 when the polygonal mirror 22 rotates and deterioration in image quality due to the deformation of the optical lens 24 caused by the air current will be described. Since the polygonal mirror 22 rotates at high speed (20000 RPM to 30000 RPM), a relatively high-speed air current is generated around the polygonal mirror 22. The optical box 20 has a sealing structure by being covered with the cover member 21 and filling a clearance therebetween with a dust preventing member in view of dust prevention. Therefore, the air current is basically circulated within the optical box 20.

The air current around the polygonal mirror 22 generated when the polygonal mirror 22 rotates is broadly classified into two kinds. One is an air current departing from the polygonal mirror 22 and another is an air current directed toward the polygonal mirror 22. The air current departing from the polygonal mirror 22 is directed toward the outside of the polygonal mirror 22 upon entrainment of air around the polygonal mirror 22 by the rotation of the polygonal mirror 22. Particularly, air in the vicinity of a surface, whose normal is the rotational axis of the polygonal mirror 22, of the polygonal mirror 22 is entrained by the rotation of the polygonal mirror 22 and forms the air current departing from the polygonal mirror 22.

Figure 7A:
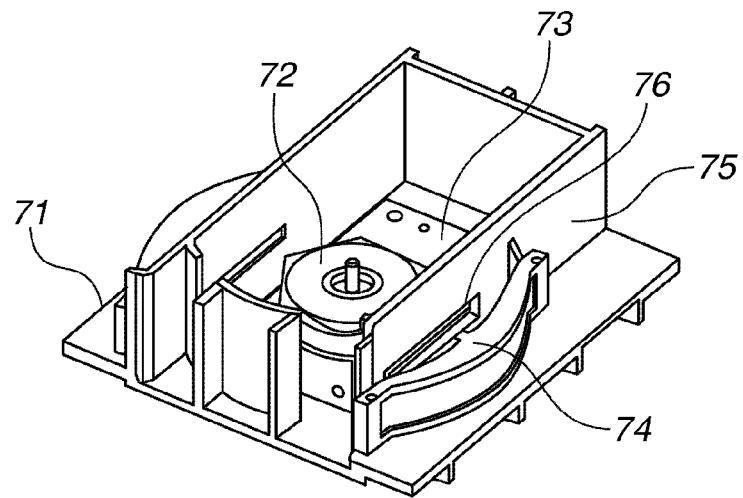
FIGS. 7A and 7B are respectively a perspective view and a top view of a conventional optical scanning apparatus, illustrating an air current around a polygonal mirror.
Figure 7B:
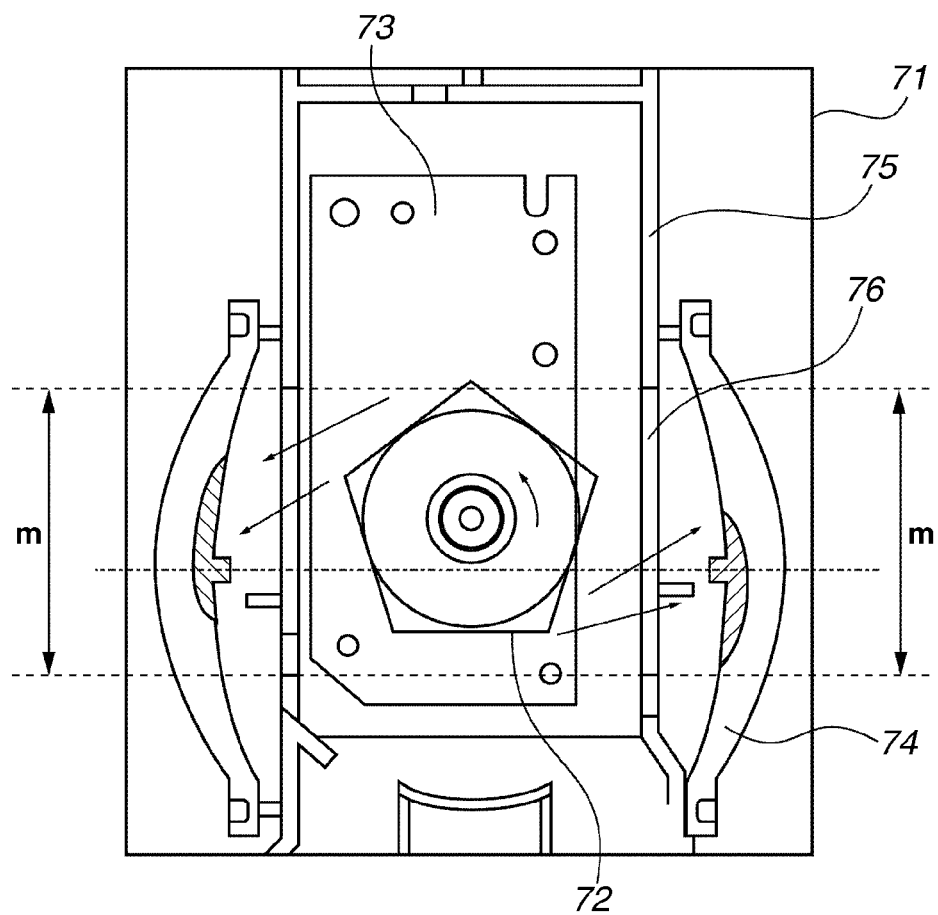

A conventional optical scanning apparatus will be described with reference to FIGS. 7A and 7B. FIG. 7A is a perspective view of a polygonal mirror 72 and its surroundings in a conventional optical scanning apparatus 71, and FIG. 7B is a top view thereof. The polygonal mirror 72 is driven to rotate by a driving device 73. As illustrated in FIG. 7A, a wall 75 for preventing hot air from striking a first optical lens 74 is provided around the polygonal mirror 72. The wall 75 is provided with a laser passing opening 76 for passing a laser beam deflected to scan by the polygonal mirror 72. In FIG. 7B, a rotational direction of the polygonal mirror 72 is a counterclockwise direction, in which an air current directed toward the outside of the polygonal mirror 72 is generated with the rotation. A part of the air current, which has passed through the laser passing opening 76 provided in the wall 75, strikes the optical lens 74.

Figure 8:
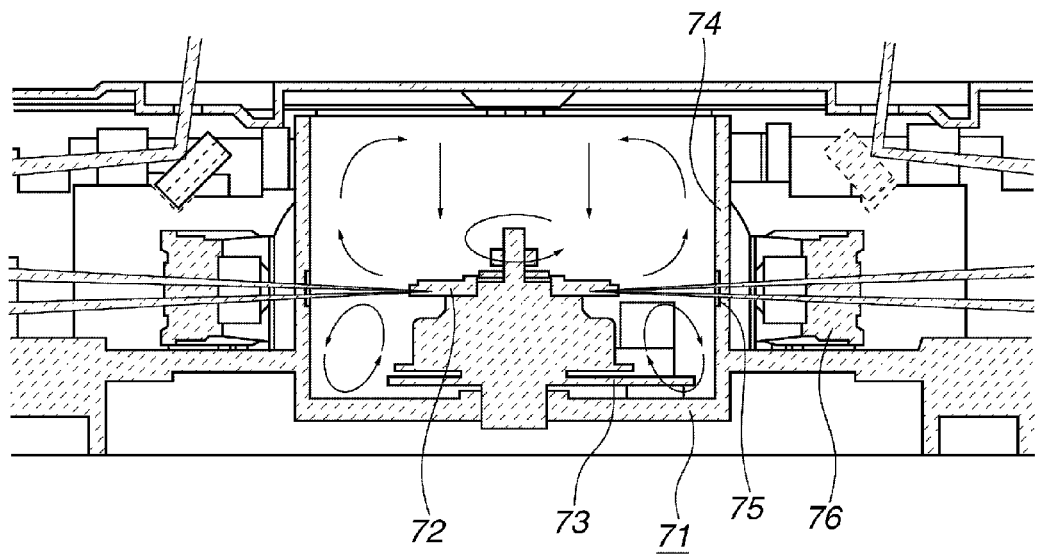
FIG. 8 is a cross sectional view of a conventional optical scanning apparatus, illustrating an air current around a polygonal mirror.

On the other hand, an air current above the polygonal mirror 72 in a direction parallel to the rotational axis thereof flows into a low-pressure portion around the polygonal mirror 72 caused by the air current departing from the polygonal mirror 72. FIG. 8 is a cross sectional view of the conventional optical scanning apparatus 71. When the polygonal mirror 72 rotates, an air current is generated in a direction indicated by an arrow, so that air is circulated. An atmospheric pressure on an upper surface portion of the polygonal mirror 72 decreases by the air current generated by the rotation of the polygonal mirror 72. Surrounding air flows into the low-pressure portion.

The air current departing from the polygonal mirror is warmed by heat generation of a polygonal mirror drive motor when the polygonal mirror rotates. The temperature of the air current is higher by five degrees to ten degrees than that of an atmosphere outside an optical box. The air current that has heated up (hereinafter referred to as hot air) passes through an opening for passing a laser beam, and strikes the optical lens arranged in the vicinity of the opening, to thermally deform the optical lens. Since a first optical lens which is arranged in the vicinity of the opening on the side opposite to the polygonal mirror with respect to the wall 75 is made of plastic, the first optical lens is thermally deformed by a temperature change, so that the refractive index thereof is changed. If the optical lens is made of general plastic material, the refractive index thereof is changed by 0.06% and the length thereof is changed by 6 µm if the lens is 10 mm long by the temperature change of 10 degrees. The change in the length shifts an image forming position on a photosensitive drum from an ideal position, so that the image quality is deteriorated.

Examples of optical performance include a change in spot diameter by focal shift of an image forming point, a change in main scanning magnification by movement of a formed image height position, and a change in irradiation position in a sub-scanning direction. Particularly in a tandem type optical scanning device, when lenses on the M and Y sides and lenses on the C and K sides make relatively different changes, color shifts of an image finally occur. Examples of a temperature change on a lens surface include a transient temperature change when the optical scanning apparatus is started from a stopped state and the subsequent steady temperature change. The effect of the transient temperature change on the color shifts becomes more significant when a factor of a difference in starting characteristics between amounts of air for heating the lenses on the M and Y sides and the lenses on the C and K sides is added.

A configuration in which hot air that strikes the optical lens 24 is easy to pass by providing a second opening (a vent) for allowing air on both sides of the wall 27 to pass, which characterizes the optical scanning apparatus 11 in the present exemplary embodiment, will be described with reference to FIG. 3. The second opening allows air in a space (a second space) where the optical member is arranged to pass to a space (a first space) where the rotational polygonal mirror is arranged. According to this configuration, the thermal deformation of the optical lens 24 due to the heated air current can be prevented.

As illustrated in FIG. 3, the optical lens 24 in the optical scanning apparatus 11 in the present exemplary embodiment is provided in the vicinity of the laser passing opening 28. Since the optical lens 24 is arranged at a position near the laser passing opening 28, hot air is difficult to pass around the optical lens 24. In order to miniaturize the apparatus, however, the distance between the members within the optical box 20 must be reduced.

In the optical scanning apparatus 11 according to the present exemplary embodiment, the walls 27 (27a and 27b) are respectively provided with second openings 29a and 29b which is cutouts (hereinafter described as the second openings 29). An upper surface of the wall 27 other than the cutouts comes into contact with the cover member 21, and air cannot pass through the wall 27 other than the laser passing opening 28 and the second opening 29. Therefore, air on the side of the polygonal mirror 22 and the optical lens 24 can pass through only the laser passing opening 28 and the second opening 29. The second opening 29 may penetrate the wall 27.

The second opening 29 is provided such that air in the space where the optical lens 24 is fixed flows into the space where the polygonal mirror 22 is fixed when the polygonal mirror 22 rotates.

Figure 5:
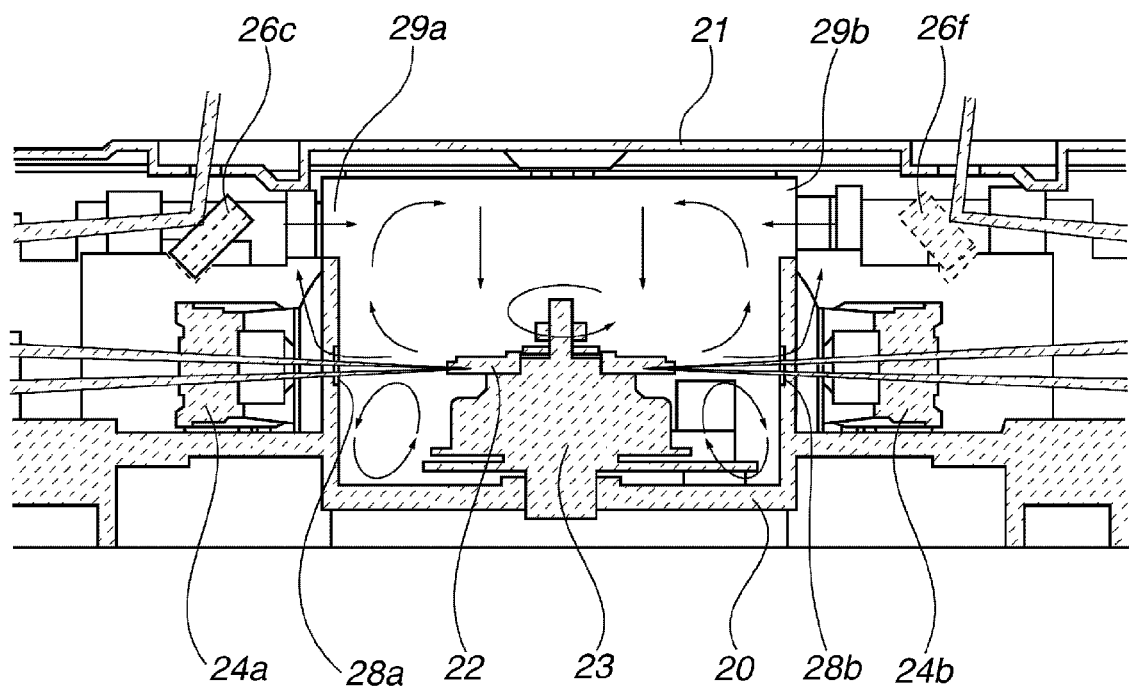
FIG. 5 is a cross sectional view of the optical scanning apparatus, illustrating an air current around the polygonal mirror.

The air current around the wall 27 that is provided with the second opening 29 will be described with reference to FIG. 5. As illustrated in FIG. 5, when the polygonal mirror 22 rotates, the air current in the vicinity of the polygonal mirror 22 is entrained by the polygonal mirror 22, and a part of the air current passes through the laser passing opening 28. With the passage, the atmospheric pressure of a portion in the vicinity of the polygonal mirror 22 decreases. Air in a space above the polygonal mirror 22 flows as a downward air current toward the polygonal mirror 22 into the low-pressure portion. The air in the space where the optical lens 24 is fixed flows into, through the second opening 29, the space above the polygonal mirror 22 in which the atmospheric pressure decreases by the downward air current. Consequently, the atmospheric pressure of a portion above the optical lens 24 decreases. The air that has passed through the laser passing opening 28 flows into the low-pressure portion. Therefore, the air current flowing into the optical lens 24 is easy to pass in the vicinity of the optical lens 24. This reduces the amount of heat applied to the optical lens 24 by the air current flowing into the vicinity of the optical lens 24, so that a temperature rise on the surface of the optical lens 24 can be reduced.

The second opening 29 is provided on the side opposite to an installation surface of the optical box 20 on which the polygonal mirror 22 is installed (a bottom surface of the optical box 20) with respect to the laser passing opening 28 in the direction parallel to the rotational axis of the polygonal mirror 22. In FIG. 3, the second opening 29 is provided above the laser passing opening 28. The second opening 29 may be provided on the same side as the installation surface of the optical box 20 with respect to the laser passing opening 28. More specifically, the second opening 29 may be provided below the laser passing opening 28 in FIG. 3.

The width of the second opening 29 in a laser scanning direction will be described. In the present exemplary embodiment, when the wall 27 is viewed form the direction parallel to the rotational axis of the polygonal mirror 22, the second opening 29 is provided such that the opening width thereof is completely overlapped with the opening width of the laser passing opening 28, as illustrated in FIG. 4.

The width of the second opening 29 can be further effectively set as follows. If hot air uniformly strikes the optical lens 24 in the laser scanning direction, the optical lens 24 is uniformly deformed throughout. Since the hot air non-uniformly strikes the optical lens 24 in the actual apparatus, however, a temperature distribution is created in the optical lens 24 in the laser scanning direction. The temperature distribution generates a difference in an amount of deformation of the optical lens 24, therefore, partial deterioration occurs in performance at each image height position due to non-uniformity in optical characteristics.

The width of the second opening 29 in the laser scanning direction is set to a width corresponding to a region of the optical lens 24 in which temperature significantly rises. The second opening 29 is provided in the wall 27 so as to face the region in which temperature significantly rises as viewed from the direction parallel to the rotational axis of the polygonal mirror 22. Accordingly, a low-pressure portion is generated above a region of the optical lens 24 in which temperature particularly rises in the laser scanning direction and causes hot air that has passed through the laser passing opening 28 to flow toward the low-pressure portion, so that the temperature distribution within the optical lens 24 can be reduced. A region of the optical lens 24 in which temperature rises is experimentally found as a value inherent to the apparatus according to the length in the laser scanning direction of the laser passing opening, a number of reflection surfaces of the polygonal mirror, the rotational speed of the polygonal mirror, and the distance between the polygonal mirror and the optical lens. In the optical scanning apparatus 11 according to the present exemplary embodiment, a hatched portion, which hot air concentrically strikes, on the optical lens 24 illustrated in FIG. 4 is specified by an experiment. In order to make an air current in the hatched portion easy to pass, the second opening 29 is provided in the wall 27 so as to have length slightly larger than the length of the hatched portion at a position facing the hatched portion in the laser scanning direction based on the result of the experiment. In FIG. 4, the laser passing opening 28 has an opening width m, and the second opening 29 has an opening width n.

Figure 4:
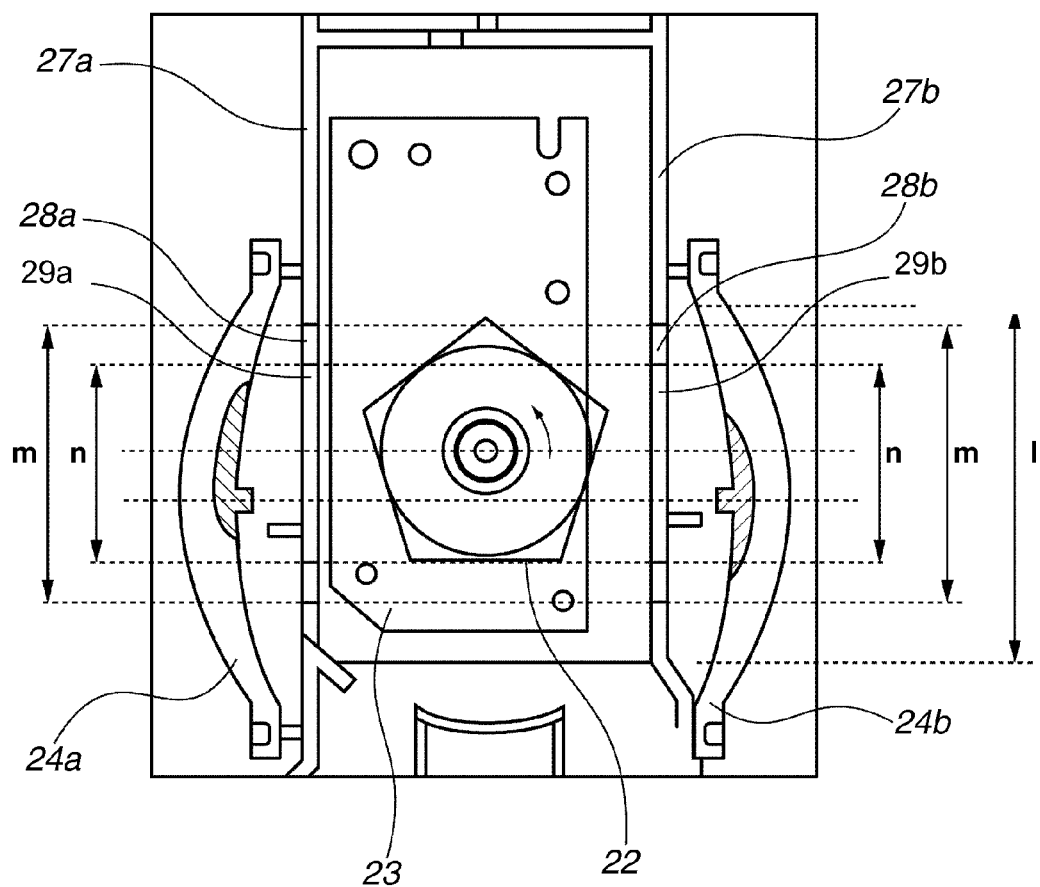
FIG. 4 is a top view of the optical scanning apparatus in the first exemplary embodiment.

In the present exemplary embodiment, the second opening 29 is provided such that the opening width n thereof falls in the opening width m of the laser passing opening 28 when the wall 27 is viewed form the direction parallel to the rotational axis of the polygonal mirror 22, as illustrated in FIG. 4. The amount of heat applied to the optical lens 24 by the hot air differs in the laser scanning direction according to the positional relationship in installation among the polygonal mirror 22, the wall 27, the laser passing opening 28, and the optical lens 24. However, according to the above-described configuration, it can be reduced that temperature difference (a temperature distribution created in a longitudinal direction of the optical lens) between a portion to which a large amount of heat is applied by the hot air and a portion to which a relatively small amount of heat is applied by the hot air of the optical lens 24. The wall 27 may be provided with the second opening 29 such that apart of the laser passing opening 28 is overlapped with a part of the second opening 29 when the wall 27 is viewed from the direction parallel to the rotational axis of the polygonal mirror 22 based on the above-described experiment.

The maximum length of the second opening 29 in the laser scanning direction is set to a length l which has optical performance of the optical lens 24. More specifically, the length of the second opening 29 is made smaller than the length that has the optical performance of the optical lens 24 (a function effective area). The length that has the optical performance refers to length of a portion which can provide a desired function in design as a lens or length of a portion which can provide a desired reflecting function in design as a reflecting mirror.

As described above, in the optical scanning apparatus 11 according to the present exemplary embodiment, the second opening 29 for passing air is provided above the laser passing opening 28 in the wall 27 which is provided between the polygonal mirror 22 and the optical lens 24. The second opening 29 allows air on the side of the optical lens 24 to pass through the second opening 29 to the polygonal mirror 22 when the polygonal mirror 22 rotates, so that a low-pressure portion is generated above the optical lens 24. The air of the optical lens 24 side flows into the low-pressure portion through the laser passing opening 28. Therefore, hot air that strikes the optical lens 24 through the laser passing opening 28 can easily escape from a gap between the optical lens 24 and the wall 27. Accordingly, thermal deformation of the optical lens 24 due to the effect of the hot air can be reduced and deterioration of the image quality can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-295800, filed Nov. 19, 2008, which is hereby incorporated by reference herein in its entirety.

What is claimed is:

1. An optical scanning apparatus comprising:
   a light source configured to emit a light beam;
   a polygonal mirror configured to deflect the light beam emitted from the light source;
   a drive unit configured to drive the polygonal mirror to rotate for scanning;
   an optical member on which the deflected light beam is incident;
   a storage member configured to house the polygonal mirror, the drive unit and the optical member therewithin; and
   a wall configured to partition a space inside the storage member into a first space that houses the polygonal mirror driven by the drive unit and a second space that houses the optical member, the wall having an opening to pass the deflected light beam toward the optical member and having a vent located between the polygonal mirror and the optical member when the vent is viewed from a direction parallel to a rotational axis of the polygonal mirror, the wall laterally extending on both lateral sides of the vent so that the first space is laterally enclosed and both lateral sides of the vent are bounded by the wall,
   wherein the vent is configured to allow at least a part of air that has passed through the opening from the first space toward the optical member in the second space to flow back into the first space while the polygonal mirror is rotating.

2. The optical scanning apparatus according to claim 1, wherein the vent is provided at a position corresponding to the optical member and the opening.

3. The optical scanning apparatus according to claim 1, wherein the vent allows the part of air to flow upward along the wall and flow back into the first space.

4. The optical scanning apparatus according to claim 1, wherein the wall having the opening and the vent is used for sealing the first space.

5. The optical scanning apparatus according to claim 1, wherein an atmospheric pressure of a portion above the optical member decreases due to rotation of the polygonal mirror.

6. The optical scanning apparatus according to claim 1, wherein a part of the opening is overlapped with a corresponding part of the vent when the wall is viewed from a direction parallel to a rotational axis of the polygonal mirror.

7. The optical scanning apparatus according to claim 1, wherein the wall is provided to face the optical member, and the vent is provided at a position corresponding to a region of the optical member so as to reduce a temperature distribution of the optical member.

8. The optical scanning apparatus according to claim 1, further comprising a cover member for enclosing the inside of the storage member.

9. The optical scanning apparatus according to claim 1, wherein the vent is formed by a cutout on the wall.

10. The optical scanning apparatus according to claim 1, wherein a width of the vent in a scanning direction of the light beam is smaller than a width of the opening in the scanning direction.

11. The optical scanning apparatus according to claim 1, wherein the optical member is positioned based on a position of the wall.

12. The optical scanning apparatus according to claim 1, wherein the wall having the vent and the opening is provided upright from a bottom surface of the storage member.

13. The optical scanning apparatus according to claim 1, further comprising other optical members in the second space, wherein at least a part of the vent is overlapped with a corresponding part of the opening when the wall is viewed from the direction parallel to the rotational axis of the polygonal mirror so that air between the opening and the optical member, which is closest to the opening among the optical members, flows upward along the wall and flows back into the first space through the vent.

14. An image forming apparatus, comprising:
a photosensitive member on which an electrostatic latent image is formed by the light beam emitted from the optical scanning apparatus according to claim 1; and
an image forming unit configured to develop the electrostatic latent image on the photosensitive member by toner and transfer the toner on the photosensitive member onto a recording medium.

15. An image forming apparatus comprising a fixing unit configured to fix an image, obtained by developing an electrostatic latent image formed on a photosensitive member by using the optical scanning apparatus according to claim 1, onto a recording medium.

16. An optical scanning apparatus comprising:
a first light source configured to emit a first light beam;
a second light source configured to emit a second light beam;
a polygonal mirror configured to deflect the first light beam emitted from the first light source and deflect the second light beam emitted from the second light source;
a drive unit configured to drive the polygonal mirror to rotate for scanning;
a first optical member on which the first deflected light beam is incident;
a second optical member on which the second deflected light beam is incident;
a storage member configured to house the polygonal mirror, the drive unit and the first and second optical members therewithin;
a first wall configured to partition a space inside the storage member into a first space that houses the polygonal mirror driven by the drive unit and a second space that houses the first optical member, the first wall having a first opening to pass the first deflected light beam toward the first optical member and having a first vent located between the polygonal mirror and the first optical member when the first vent is viewed from a direction parallel to a rotational axis of the polygonal mirror, the first wall laterally extending on both lateral sides of the first vent so that the first space is laterally enclosed and both lateral sides of the first vent are bounded by the first wall; and
a second wall configured to partition a space inside the storage member into the first space and a third space that houses the second optical member, the second wall having a second opening to pass the second deflected light beam toward the second optical member and having a second vent located between the polygonal mirror and the second optical member when the second vent is viewed from a direction parallel to the rotational axis of the polygonal mirror, the second wall laterally extending on both lateral sides of the second vent so that the first space is laterally enclosed and both lateral sides of the second vent are bounded by the second wall,
wherein the first vent is configured to allow at least a part of air that has passed through the first opening from the first space toward the first optical member in the second space to flow back into the first space while the polygonal mirror is rotating, and
wherein the second vent is configured to allow at least a part of air that has passed through the second opening from the first space toward the second optical member in the third space to flow back into the first space while the polygonal mirror is rotating.

17. The optical scanning apparatus according to claim 16, wherein the first and second vents are symmetric with respect to a line crossing the rotational axis of the polygonal mirror.

18. The optical scanning apparatus according to claim 17, wherein the polygonal mirror is rotated by the drive unit for scanning in a scanning direction, and the line crossing the rotational axis is parallel to the scanning direction.

19. The optical scanning apparatus according to claim 18, wherein the first and second walls are parallel to the scanning direction.

20. An image forming apparatus, comprising:
a photosensitive member on which an electrostatic latent image is formed by the first beam emitted from the optical scanning apparatus according to claim 17; and
an image forming unit configured to develop the electrostatic latent image on the photosensitive member by toner and transfer the toner on the photosensitive member onto a recording medium.

21. An image forming apparatus, comprising a fixing unit configured to fix an image, obtained by developing an electrostatic latent image formed on a photosensitive member by using the optical scanning apparatus according to claim 17, onto a recording medium.

22. The optical scanning apparatus according to claim 16, wherein a first width of the first vent in a scanning direction of the first light beam is the same as a second width of the second vent in the scanning direction.

23. The optical scanning apparatus according to claim 16, wherein the first wall has the first vent so that at least a part of the air that has passed from the first space to the second space flows upward along the first wall and flows back into the first space through the first vent while the polygonal mirror is rotating.

24. The optical scanning apparatus according to claim 16, wherein the first wall has the first vent above the first opening at a position corresponding to the first optical member.

25. The optical scanning apparatus according to claim 16, wherein an atmospheric pressure of a portion above the first optical member decreases due to rotation of the polygonal mirror.

26. The optical scanning apparatus according to claim 16, wherein a part of the first opening is overlapped with a corresponding part of the first vent when the first wall is viewed from a direction parallel to the rotational axis of the polygonal mirror.

27. The optical scanning apparatus according to claim 16, wherein a first width of the first vent in a first scanning direction of the first light beam is smaller than a width of the first opening in the first scanning direction, and wherein a second width of the second vent in a second scanning direction of the second light beam is smaller than a width of the second opening in the second scanning direction.

28. The optical scanning apparatus according to claim 16, wherein the first wall is provided so as to face the first optical member, and the first vent is provided at a position corresponding to a region of the first optical member so as to reduce a temperature distribution of the first optical member, and wherein the second wall is provided so as to face the second optical member, and the second vent is provided at a position corresponding to a region of the second optical member so as to reduce a temperature distribution of the second optical member.

29. The optical scanning apparatus according to claim 16, wherein the storage member includes a cover member for enclosing the inside thereof.

30. The optical scanning apparatus according to claim 16, wherein the first vent is formed by a cutout on the first wall, and the second vent is formed by a cutout on the second wall.

31. The optical scanning apparatus according to claim 16, wherein the first wall and the second wall are parallel to each other.

32. The optical scanning apparatus according to claim 16, wherein the first and second optical member are positioned based on the position of the first and second walls, respectively.

* * * * *